(12) United States Patent
DeMarco et al.

(10) Patent No.: US 10,809,156 B2
(45) Date of Patent: Oct. 20, 2020

(54) AUTOMATED SYSTEM AND METHOD FOR GENERATING ENGINE TEST CELL ANALYTICS AND DIAGNOSTICS

(71) Applicant: General Electric Company, Schenectady, NY (US)

(72) Inventors: Susan Michelle DeMarco, Centerville, OH (US); Charles Larry Abernathy, West Chester, OH (US); Steven Richard Levin, West Chester, OH (US); Bernard Dumm, Loveland, OH (US); Brett Stephen Kramer, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 266 days.

(21) Appl. No.: 15/043,655

(22) Filed: Feb. 15, 2016

(65) Prior Publication Data
US 2017/0234773 A1    Aug. 17, 2017

(51) Int. Cl.
*G01M 15/14*    (2006.01)
*G01M 15/02*    (2006.01)

(52) U.S. Cl.
CPC ............ *G01M 15/14* (2013.01); *G01M 15/02* (2013.01)

(58) Field of Classification Search
CPC ... F05D 2260/81; G01M 15/02; G01M 15/14; G01M 15/00; G01M 15/04; G07C 5/0808; G06Q 10/04; G06F 11/3688
(Continued)

(56) References Cited

U.S. PATENT DOCUMENTS 5,021,997 A * 6/1991 Archie ................ G06F 11/2257
                                                 702/123
5,951,611 A    9/1999 La Pierre
(Continued)

FOREIGN PATENT DOCUMENTS

CN    102889992 A    1/2013
EP    1 970 786 A2   9/2008
(Continued)

OTHER PUBLICATIONS

Machine Translation and Notification of Reasons for Refusal issued in connection with corresponding JP Application No. 2017-017235 dated Jan. 9, 2018.
(Continued)

*Primary Examiner* — Eric S. McCall
(74) *Attorney, Agent, or Firm* — Wood IP LLC (57) ABSTRACT

The present disclosure is directed to an automated system and method of analyzing performance of engines in a test cell. The method includes electronically accessing engine operational data in a stored database of the test cell. Another step includes electronically retrieving operational data corresponding to the new test if at least one new test is detected in the stored database for an engine. Further, the method includes inputting the operational data corresponding to the new test into a performance model specific to an engine type for the engine. The method also includes electronically analyzing an output of the performance model. An additional step includes electronically generating at least one summary report of engine health of the engine based on the analyzed output. Thus, the method also includes providing the summary report as electronic output to a user.

20 Claims, 5 Drawing Sheets

(58) Field of Classification Search
USPC .................. 73/112.01, 114.01; 702/183–185
See application file for complete search history.

(56) References Cited

U.S. PATENT DOCUMENTS

| | | | |
|---|---|---|---|
| 7,627,454 | B2 | 12/2009 | LaComb et al. |
| 7,702,435 | B2 | 4/2010 | Pereira et al. |
| 8,060,340 | B2 | 11/2011 | Gao et al. |
| 8,090,559 | B2 | 1/2012 | Parthasarathy et al. |
| 8,165,826 | B2 | 4/2012 | Schimert et al. |
| 8,655,571 | B2 | 2/2014 | Geib et al. |
| 8,667,332 | B2 | 3/2014 | Bharadwaj et al. |
| 8,682,509 | B2 | 3/2014 | Goodrich et al. |
| 8,914,149 | B2 | 12/2014 | Safa-Bakhsh et al. |
| 2004/0243636 | A1* | 12/2004 | Hasiewicz .......... G05B 23/0251 |
| 2006/0168475 | A1* | 7/2006 | Segers ................ G06F 11/0733 714/25 |
| 2008/0154473 | A1 | 6/2008 | Volponi et al. |
| 2008/0228338 | A1* | 9/2008 | Howard ............. G05B 23/0254 701/31.4 |
| 2009/0198474 | A1* | 8/2009 | Fritz .................... G01M 15/06 702/183 |
| 2011/0172966 | A1* | 7/2011 | Albsmeier .......... G01M 15/046 702/183 |
| 2012/0283885 | A1 | 11/2012 | Mannar et al. |
| 2013/0166135 | A1 | 6/2013 | Dunsdon |
| 2013/0199204 | A1 | 8/2013 | Camhi et al. |
| 2014/0031958 | A1 | 1/2014 | Loganathan et al. |
| 2014/0271114 | A1 | 9/2014 | Phillips et al. |
| 2015/0293503 | A1 | 10/2015 | Wall et al. |

FOREIGN PATENT DOCUMENTS

| | | |
|---|---|---|
| JP | 2002-130054 A | 5/2002 |
| JP | 2003-044122 A | 2/2003 |
| JP | 2003-195935 A | 7/2003 |
| JP | 2005-339558 A | 12/2005 |
| JP | 2008-267387 A | 11/2008 |
| JP | 2009-168812 A | 7/2009 |
| JP | 2011-501170 A | 1/2011 |
| WO | 2013/030984 A1 | 3/2013 |

OTHER PUBLICATIONS

Jones, S.M., et al., "GT2010-22350 Steady-State Modeling of Gas Turbine Engines Using the Numerical Propulsion System Simulation Code," Retrieved from the Internet URL: http://www.ewp.rpi.edu/hartford/-ernesto/S2012/EP/MaterialsforStudents/Harter/Jones2010.pdf, on Mar. 2, 2012, pp. 1-28 (Jun. 14-18, 2010).

Extended European Search Report and Opinion issued in connection with corresponding EP Application No. 17155636.8 dated Jun. 23, 2017.

Machine Translation and First Office Action and Search issued in connection with corresponding CN Application No. 201710080739.1 dated Aug. 29, 2018.

* cited by examiner

ENGINE TYPE

TEST DATE: ___________  TEST RATING: ___________
CUSTOMER: ___________  POWER RATING: ___________

TABLE 1

| COMPONENT | CORE ANALYSIS |  | TCDR ANALYSIS |  |
|---|---|---|---|---|
| FAN | 3.2 ± 5.5 | °C | 7.6 ± 5.5 | °C |
| LPC |  |  | 1.3 ± 1.6 | °C |
| HPC | −18.2 ± 14.1 | °C | −18.2 ± 12.5 | °C |
| HPT | −51.4 ± 14.1 | °C | −42.5 ± 7.4 | °C |
| LPT |  |  | −1.7 ± 5.0 | °C |
| EGT MEAS | 2.2 ± 12.9 | °C | −2.2 ± 16.8 | °C |
| TOTAL | −64.3 ± 15.0 | °C | −55.8 ± 11.5 | °C |

EGT MARGIN STACK CHART 134

ANALYSIS SUMMARY 134

- EGT MARGIN IS 64.3 DEG C LESS THAN THE BASELINE AVERAGE
- TCDR ANALYSIS SUGGESTS PRIMARY CONTRIBUTORS ARE:
  - HPT ~ −42.5 DEG C
  - HPC ~ −18.2 DEG C

RECOMMENDATIONS 136

- HPT
- IF REJECTED, ASSESS BLADE TIP CLEARANCES/RUBS, FOS SEAL CLEARANCES/RUBS AND CHECK FOR ANY CORE LEAKS
- HPC
- IF REJECTED ASSESS BLADE & VANE TIP CLEARANCES/RUBS, CDP & 4R SEAL CLEARANCES/RUBS

FIG. −5−

AUTOMATED SYSTEM AND METHOD FOR GENERATING ENGINE TEST CELL ANALYTICS AND DIAGNOSTICS

FIELD OF THE INVENTION

The subject matter disclosed herein relates generally to engine test cells, and more particularly to systems and methods for automatically generating engine test cell analytics and diagnostic reports.

BACKGROUND OF THE INVENTION

A gas turbine engine generally includes, in serial flow order, a compressor section, a combustion section, a turbine section and an exhaust section. In operation, air enters an inlet of the compressor section where one or more axial or centrifugal compressors progressively compress the air until it reaches the combustion section. Fuel is mixed with the compressed air and burned within the combustion section to provide combustion gases. The combustion gases are routed from the combustion section through a hot gas path defined within the turbine section and then exhausted from the turbine section via the exhaust section.

In particular configurations, the turbine section includes, in serial flow order, a high pressure (HP) turbine and a low pressure (LP) turbine. The HP turbine and the LP turbine each include various rotatable turbine components such as turbine rotor blades, rotor disks and retainers, and various stationary turbine components such as stator vanes or nozzles, turbine shrouds, and engine frames. The rotatable and stationary turbine components at least partially define the hot gas path through the turbine section. As the combustion gases flow through the hot gas path, thermal energy is transferred from the combustion gases to the rotatable and stationary turbine components.

Such gas turbine engines are commonly employed in an aircraft. Thus, it is common to test performance of such engines in a test cell, e.g. at an overhaul shop, before being installed on the aircraft so as to maximize time of the engine on-wing. Conventional testing of engines, however, identifies performance issues manually using limited data and a manual analysis process, which can take days to complete.

For example, such manual techniques may involve mining through reams of data to find particular engine operations and/or events, filtering through those operations/events to find relevant operations/events, extracting a few signals from the data, and then plotting the signals against one another. Such lengthy and complex steps typically have to be repeated for each issue as it arises. As such, a need remains to automate and streamline data analysis associated with the events occurring within the test cell environment.

The ability to analyze historical data can also be difficult because of the sheer volume of information captured in conventional monitoring systems and the limited ways to sort and access such data. Without ways to identify and store data associated with past operational events, an analyst may be forced to manually sort through extensive amounts of historical data to identify desired information. A need thus also remains for providing an ability to sort through and analyze historical engine data and/or to provide meaningful comparisons of current data to historical data.

In view of the aforementioned, the art is continuously seeking improved systems and methods for generating test cell analytics and diagnostic reports for such engines.

BRIEF DESCRIPTION OF THE INVENTION

Aspects and advantages of the invention will be set forth in part in the following description, or may be obvious from the description, or may be learned through practice of the invention.

In one aspect, the present disclosure is directed to a method for analyzing performance of engines in a test cell. The method includes electronically accessing engine operational data in a stored database of the test cell. If at least one new test is detected in the stored database for an engine, the method also includes electronically retrieving operational data corresponding to the new test. Further, the method includes inputting the operational data corresponding to the new test into a performance model specific to an engine type for the engine. The method also includes electronically analyzing an output of the performance model. An additional step includes electronically generating at least one summary report of engine health of the engine based on the analyzed output. Thus, the method also includes providing the summary report as electronic output to a user.

In another aspect, the present disclosure is directed to an engine test cell analysis system. The system includes a controller having at least one processor and at least one memory device. The memory device includes computer-readable instructions for execution by the processor. The processor is configured to perform one or more operations, including but not limited to electronically accessing engine operational data in a stored database of the test cell, if at least one new test is detected in the stored database for an engine, retrieving operational data corresponding to the new test, inputting the operational data corresponding to the new test into a performance model specific to an engine type for the engine, electronically analyzing an output of the performance model, and electronically generating at least one summary report of engine health of the engine based on the analyzed output. The system also includes at least one output device for providing the summary report as electronic output to a user.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference is now made to particular embodiments of the invention, one or more examples of which are illustrated in the drawings. Each embodiment is presented by way of explanation of aspects of the invention, and should not be taken as a limitation of the invention. For example, features illustrated or described with respect to one embodiment may be used with another embodiment to yield a still further embodiment. It is intended that the present invention include these and other modifications or variations made to the embodiments described herein.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

Generally, the present disclosure is directed to a test cell for a gas turbine engine and a method of analyzing performance of engines in same. The method includes electronically accessing engine operational data in a stored database of the test cell. When new test data is detected in the database, the method includes inputting the operational data corresponding to the new test into a performance model specific to the engine type of the engine and electronically analyzing the output of the performance model. Thus, the method also includes electronically generating at least one summary report of engine health of the engine based on the analyzed output. Further, the method also includes providing the summary report as electronic output to a user. In addition, the present disclosure may be configured to diagnose performance issues associated with the test cell, the test-enabling software, and/or the corresponding instrumentation.

The present disclosure provides many advantages not present in the prior art. For example, the present disclosure is an automatic process that can be completed in a minimal time frame (e.g. less than one hour or less than the time it takes for the engine to cool off after testing) as opposed to conventional manual processes that can take days to complete. As such, the systems and methods of the present disclosure provide the overhaul shop with prompt diagnostic support that is needed to identify root causes for performance issues, thereby saving time and money. Further, the automated process of the present disclosure has improved analytical accuracy and has the capacity to evaluate each engine tested, rather than only the worst case engines.

By evaluating each engine tested and monitoring for shifts and trends, the systems and methods of the present disclosure provide an early warning of performance issues that can impact time on the wing of an aircraft. Such early warnings enable intervention before the engines leave the overhaul shop. In addition, monitoring every engine also satisfies the Federal Aviation Administration's (FAA) recommendation to trend test cell performance between correlations.

Figure 1:
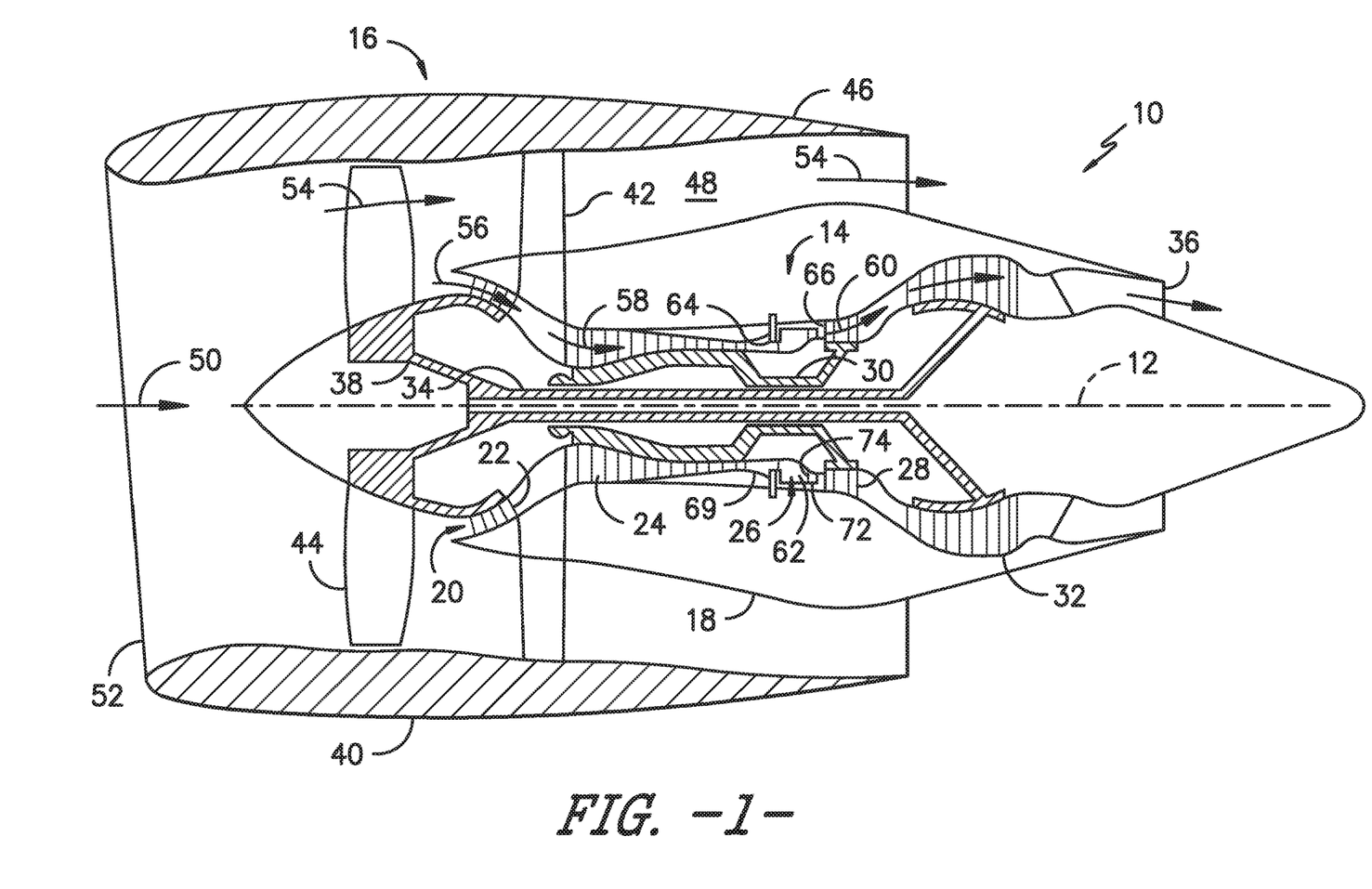
FIG. 1 illustrates a schematic cross-sectional view of one embodiment of a gas turbine engine according to the present disclosure.

Referring now to the drawings, FIG. 1 illustrates a schematic cross-sectional view of one embodiment of a gas turbine engine 10 (high-bypass type) according to the present disclosure. More specifically, the gas turbine engine 10 may include an aircraft engine, e.g. for an airplane, helicopter, or similar. As shown, the gas turbine engine 10 has an axial longitudinal centerline axis 12 therethrough for reference purposes. Further, as shown, the gas turbine engine 10 preferably includes a core gas turbine engine generally identified by numeral 14 and a fan section 16 positioned upstream thereof. The core engine 14 typically includes a generally tubular outer casing 18 that defines an annular inlet 20. The outer casing 18 further encloses and supports a booster 22 for raising the pressure of the air that enters core engine 14 to a first pressure level. A high pressure, multi-stage, axial-flow compressor 24 receives pressurized air from the booster 22 and further increases the pressure of the air. The compressor 24 includes rotating blades and stationary vanes that have the function of directing and compressing air within the turbine engine 10. The pressurized air flows to a combustor 26, where fuel is injected into the pressurized air stream and ignited to raise the temperature and energy level of the pressurized air. The high energy combustion products flow from the combustor 26 to a first (high pressure) turbine 28 for driving the high pressure compressor 24 through a first (high pressure) drive shaft 30, and then to a second (low pressure) turbine 32 for driving the booster 22 and the fan section 16 through a second (low pressure) drive shaft 34 that is coaxial with the first drive shaft 30. After driving each of the turbines 28 and 32, the combustion products leave the core engine 14 through an exhaust nozzle 36 to provide at least a portion of the jet propulsive thrust of the engine 10.

The fan section 16 includes a rotatable, axial-flow fan rotor 38 that is surrounded by an annular fan casing 40. It will be appreciated that fan casing 40 is supported from the core engine 14 by a plurality of substantially radially-extending, circumferentially-spaced outlet guide vanes 42. In this way, the fan casing 40 encloses the fan rotor 38 and the fan rotor blades 44. The downstream section 46 of the fan casing 40 extends over an outer portion of the core engine 14 to define a secondary, or bypass, airflow conduit 48 that provides additional jet propulsive thrust.

From a flow standpoint, it will be appreciated that an initial airflow, represented by arrow 50, enters the gas turbine engine 10 through an inlet 52 to the fan casing 40. The airflow passes through the fan blades 44 and splits into a first air flow (represented by arrow 54) that moves through the conduit 48 and a second air flow (represented by arrow 56) which enters the booster 22.

The pressure of the second compressed airflow 56 is increased and enters the high pressure compressor 24, as represented by arrow 58. After mixing with fuel and being combusted in the combustor 26, the combustion products 60 exit the combustor 26 and flow through the first turbine 28. The combustion products 60 then flow through the second turbine 32 and exit the exhaust nozzle 36 to provide at least a portion of the thrust for the gas turbine engine 10.

Still referring to FIG. 1, the combustor 26 includes an annular combustion chamber 62 that is coaxial with the longitudinal centerline axis 12, as well as an inlet 64 and an outlet 66. As noted above, the combustor 26 receives an annular stream of pressurized air from a high pressure compressor discharge outlet 69. Fuel is injected from a fuel nozzle to mix with the air and form a fuel-air mixture that is provided to the combustion chamber 62 for combustion. Ignition of the fuel-air mixture is accomplished by a suitable igniter, and the resulting combustion gases 60 flow in an axial direction toward and into an annular, first stage turbine nozzle 72. The nozzle 72 is defined by an annular flow channel that includes a plurality of radially-extending, circumferentially-spaced nozzle vanes 74 that turn the gases so that they flow angularly and impinge upon the first stage turbine blades of the first turbine 28. As shown in FIG. 1, the first turbine 28 preferably rotates the high-pressure compressor 24 via the first drive shaft 30, whereas the low-pressure turbine 32 preferably drives the booster 22 and the fan rotor 38 via the second drive shaft 34.

Figure 2:
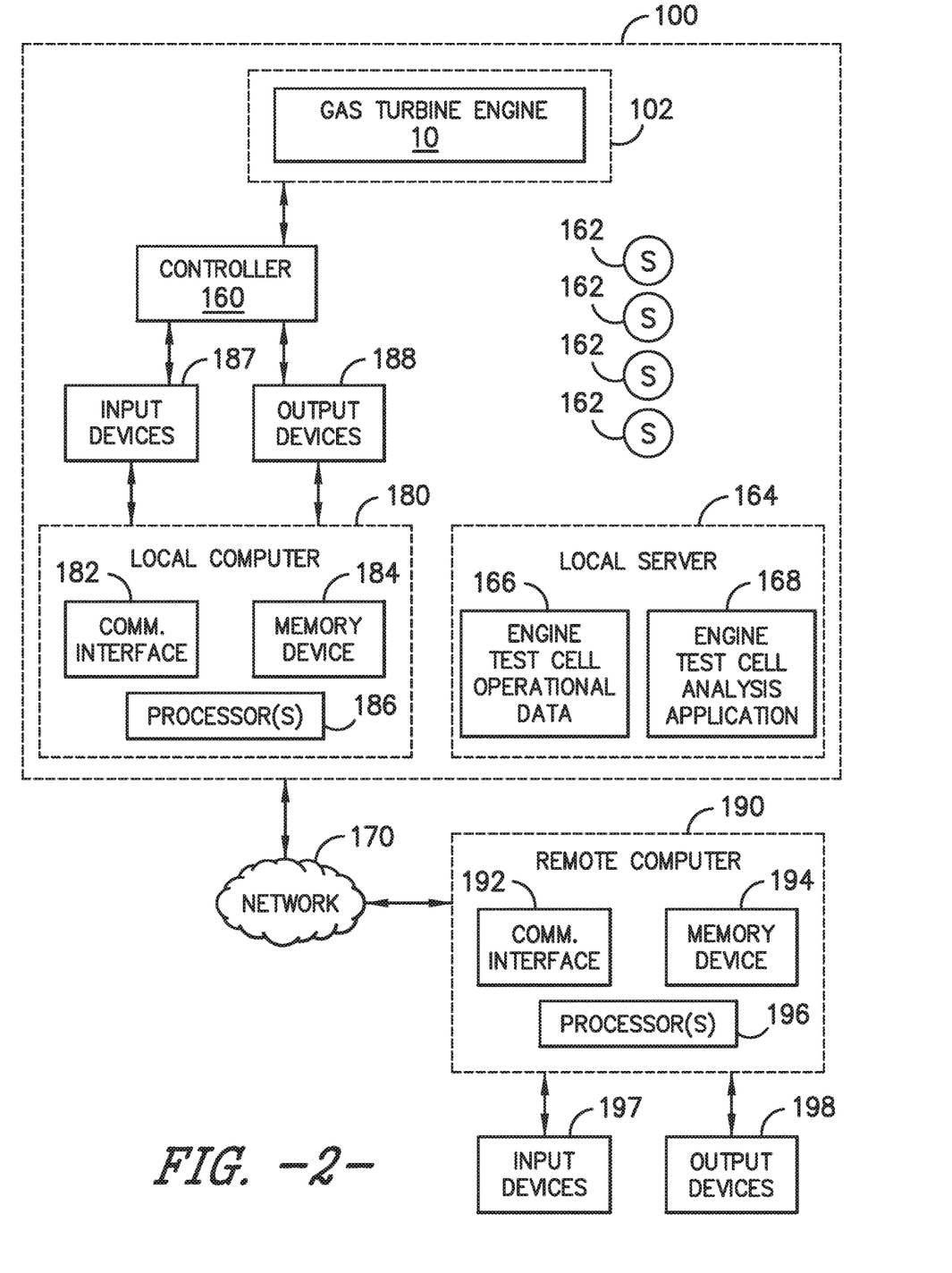
FIG. 2 illustrates a schematic diagram of one embodiment of an engine test cell analysis system according to the present disclosure.

Referring now to FIG. 2, a schematic block diagram of one embodiment of an engine test cell analysis system 100 is illustrated. As shown, the system 100 includes a gas turbine engine 10 within a test cell 102 being controlled by a controller 160. The controller 160 may include a computerized control system electrically linked to each component of the system 100. Further, the system 100 may also include a local computer and/or a remote computer 180, 190, with each computer respectively including one or more communication interfaces 182, 192, one or more memory devices 184, 194, and one or more processors 186, 196. The memory device 184 may include computer-readable instructions for execution by the processor 186. Thus, the processor(s) 186, 196 is configured to perform one or more operations, including for example, the operations set forth in FIG. 4.

More specifically, the processor 186 may be configured to continuously store engine operational data from testing a plurality of engines in the test cell 102 in real-time in the memory device 184. For example, the data obtained from various sensors 162 in the test cell 102 of the system 100 may be provided to a local server 164. The monitored test cell data is represented in FIG. 2 as a database 166 within the local server 164. Although illustrated as a single module 166 for storing engine data, it should be appreciated that multiple databases, servers, or other related computer or data storage devices may be used to store the monitored data from sensors 162.

Another primary physical component of the system 100 may include a software package including an engine test cell analysis application 168 configured to analyze data generated by the gas turbine engine 10 within the test cell 102. As shown the engine test cell analysis application 168 may be stored on the local server 164. Thus, the engine test cell analysis application 168 is configured to access and analyze the engine test cell operational data 166, such as may be received from the controller 160 interfaced with the sensors 162 that are provided within system 100 for tracking and capturing various monitored characteristics of system 100 in the test cell 102. It should be appreciated that although the engine test cell operational data 166 and the engine test cell analysis application 168 are depicted in FIG. 2 as being stored at a local server location 164, the memory containing such computer-readable data and instructions may actually be located in a variety of locations local to or remote from the engine test cell. In addition, multiple test cells and/or locations may leverage a single memory device to increase the flexibility of the system.

The engine test cell analysis application 168 may be a software-based module having a set of computer-readable and executable instructions that are stored on a tangible computer-readable medium. For example, as shown in FIG. 3, the engine test cell analysis application 168 may include a plurality of different software modules adapted for execution by one or more processors accessing the application 168 to implement one or more processing steps, including but not limited to a data gathering and formatting module 172, an engine statistical analysis module 174, a reasoner module 176, and a summary report generation module 178.

A first exemplary module within the subject engine test cell analysis application 168 corresponds to the data gathering and formatting module 172. Thus, the engine test cell analysis application 168 may include various instructions for analyzing engine test cell data 166 in accordance with a variety of preconfigured definitions defining one or more engine operations. Exemplary engine test cell operational data may include but are not limited to starts, shutdowns, trips, load rejections, fuel transfers, combustion mode transfers, islanded load steps, periods suitable for steady-state performance evaluation, loading, unloading, transients affecting engine component life, and/or any other data associated with the engine being tested. Continuous realtime engine test cell operational data 166 that is received from the plurality of sensors 162 or other monitoring devices within the test cell 102 can then be processed and further analyzed. More specifically, in certain embodiments, the data gathering and formatting module 172 may selectively implement one or more steps including but not limited to accessing engine test cell data, handling missing data tags, and adding a data buffer.

Figure 4:
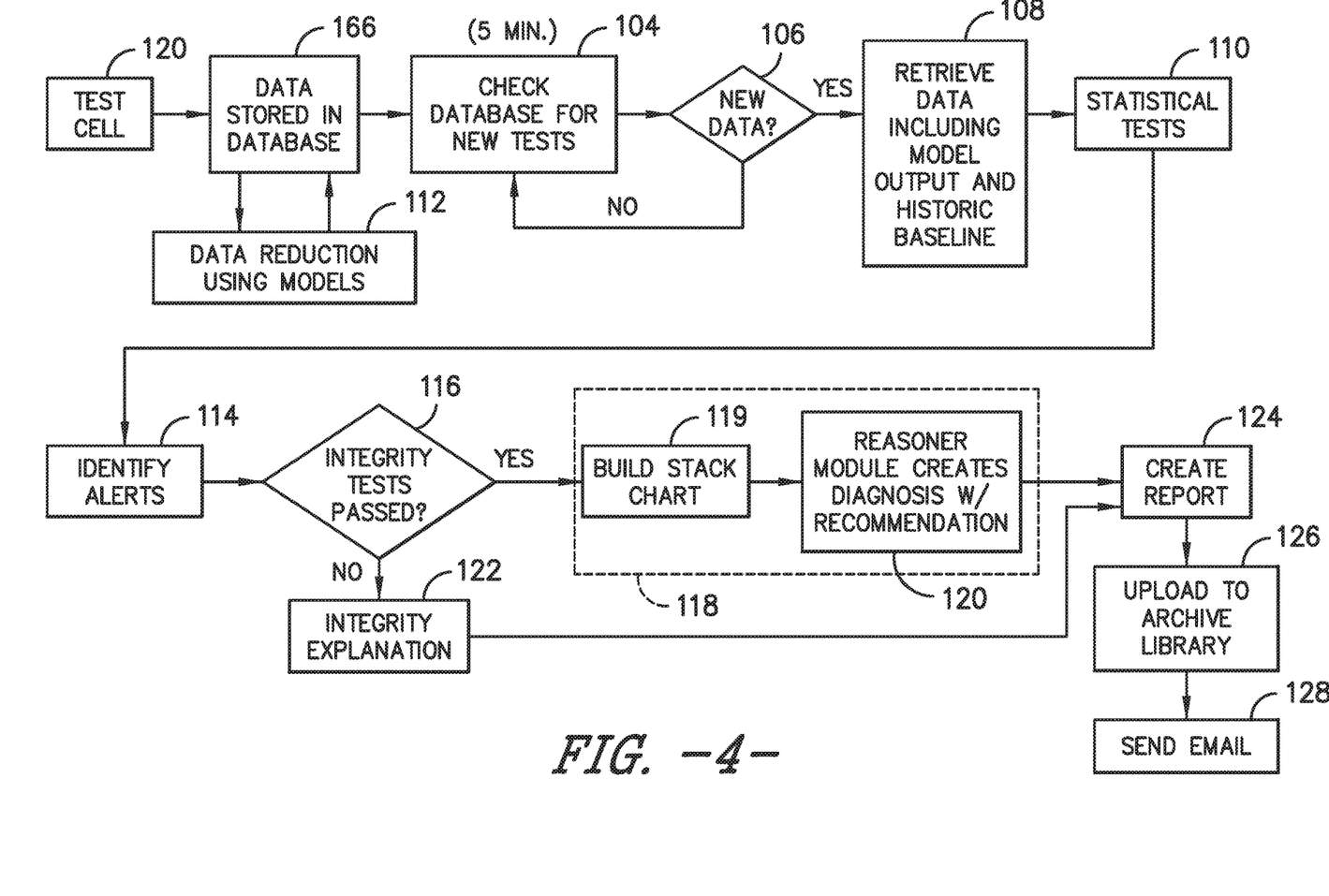
FIG. 4 illustrates a flow diagram of one embodiment of a method for analyzing performance of engines in a test cell according to the present disclosure.

For example, the data gathering and formatting module 172 is configured to electronically access the engine test cell operational data 166 stored in the test cell database, e.g. memory device 184, of the test cell 102. Further, as shown in FIG. 4 at 104, the data gathering and formatting module 172 may be configured to incrementally check the stored database for new tests in the test cell 102, e.g. every five (5) minutes. It should be understood that the database may be checked at any suitable increment including more than five minutes and less than five minutes. As shown at 106 of FIG. 4, if a new test is detected in the stored database for the tested engine 10, the data gathering and formatting module 172 is configured to retrieve operational data corresponding to the new test, e.g. from the engine test cell operational data module 166.

Figure 3:
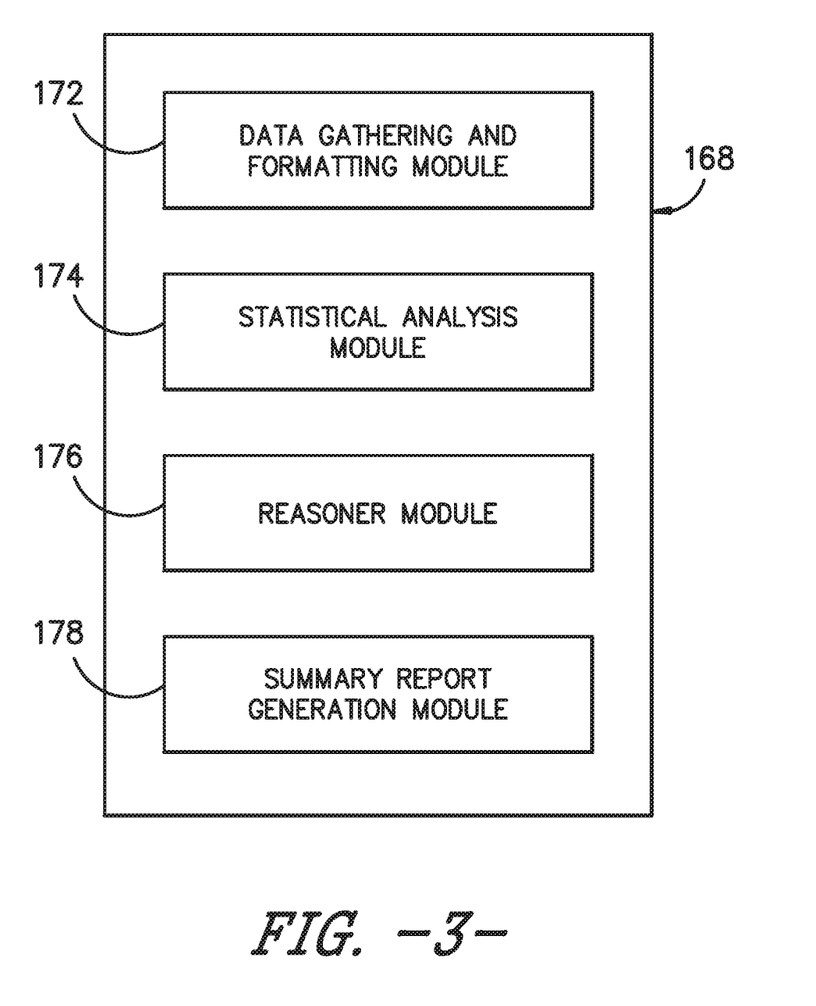
FIG. 3 illustrates a schematic diagram of one embodiment of components that may be included in an engine test cell analysis application according to the present disclosure.

Another exemplary module within the subject engine test cell analysis application 168 corresponds to the reasoner module 176, as shown in FIG. 3. In certain embodiments, the reasoner module 176 includes a diagnostic algorithm configured to run the data from the data gathering and formatting module 172 through a performance model. More specifically, as shown at 112 of FIG. 4, the reasoner module 176 may be configured to input the operational data corresponding to the new test data into a physics-based performance model, an experience-based performance model, or both. For example, the physics-based performance model may be a Numerical Propulsion System Simulation (NPSS) model specific to the engine type for the engine 10. As used herein, a NPSS model is an object-oriented, multi-physics, engineering design and simulation environment that enables development, collaboration and seamless integration of system models. Thus, as shown at 108, the reasoner module 176 may also be configured to compare an output from the performance model with historical data and draw conclusions therefrom. In certain embodiments, the historical data may include data from previously tested baseline engines of the same type that were tested in the test cell at a corresponding test rating and a corresponding power rating.

Still another exemplary module within the subject engine test cell analysis application 168 corresponds to the engine statistical analysis module 174, as shown in FIG. 3. As shown at 110 of FIG. 4, the engine statistical analysis module 174 is configured to perform statistical tests on the output from the data gathering and formatting module 172 in order to detect shifts, trends, and/or outliers whose data patterns fall outside of at least one pre-configured standard, as described herein. Outlier detection is generally implemented to detect patterns in the engine test cell data that do not conform to pre-configured standards of operation. In one example of outlier detection, univariate statistical analysis and/or multivariate statistical analysis may be used to identify outliers.

As shown at 114 of FIG. 4, the engine test cell analysis application 168 is also configured to electronically generate one or more alerts when non-optimal or anomalous behavior is detected within the operational data corresponding to the new test. In other words, alerts are identified for any performance parameter or critical instrumentation that is flagged by one of the statistical tests. The alarm generation may be used, for example, to generate alarms if some non-optimal and/or anomalous behavior is observed during engine operations, such as startup and shutdown. The alerts described herein may be relayed in the form of text, charts or graphs of the supporting data in the generated report.

In further embodiments, as shown at 116, the engine test cell analysis application 168 may also perform one or more integrity tests to the operational data 166 corresponding to the new test to ensure the operational data is reliable, i.e. before electronically analyzing the operational data 166 corresponding to the new test. Thus, the integrity tests are applied to determine if the current engine test data is reliable enough for further diagnostic analysis. If the integrity tests are passed, then the reasoner module 176 is configured to determine one or more recommendations if the performance is poor. If the engine performance is normal, then the reasoner module 176 identifies that the engine is operating within an expected range of performance and will consequently output zero recommendations. More specifically, as shown at 118, the reasoner module 176 is configured to create an engine performance diagnosis with corresponding recommendations.

Figure 5:
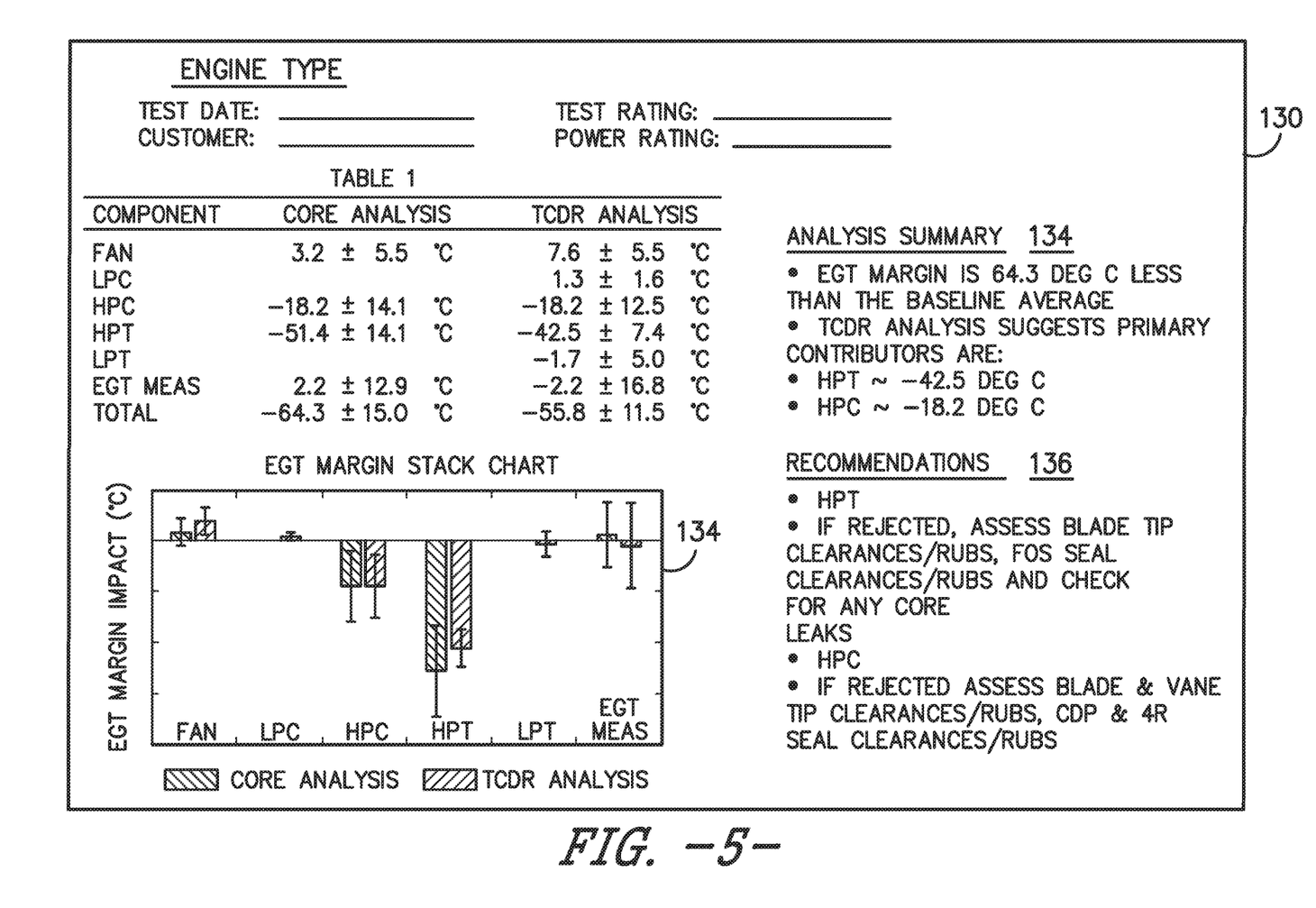
FIG. 5 illustrates a schematic diagram of one embodiment of a summary report generated by an engine test cell analysis system according to the present disclosure.

Further, the reasoner module 176 may use diagnostic baselines for each test cell 102/engine model combination. Thus, the diagnostic baselines are intended to represent current process capability. In many overhaul shops where engines are tested, personnel performing the tests are not engine experts. As such, as shown at 120, it is beneficial for the reasoner module 176 to create a diagnostic report as well as corresponding recommendations so that the personnel can improve engine performance after the test is complete. More specifically, the reasoner module 176 may include one or more algorithms configured to create such a diagnosis with corresponding recommendations. For example, in certain embodiments, the reasoner module 176 may perform at least two analysis methods, including for example a Test Cell Data Reduction (TCDR) analysis and a core analysis. In such embodiments, all analysis methods compare the test engine to the diagnostic baselines. Thus, in the example of FIG. 5, TCDR analysis converts deltas from the diagnostic baselines to impact on exhaust gas temperature (EGT) for each component, whereas core analysis provides a simplified analysis based on EGT, specific-fuel consumption (SFC), and calculations of compression efficiency. Using core analysis provides a sanity check for TCDR. The results of the two analysis methods may be displayed using any suitable method. For example, at 119, the reasoner module 176 may build a stack chart 132 (e.g. for exhaust gas temperature (EGT) margin as shown in FIG. 5), which can be included in the summary report 130, which will be discussed in more detail below.

As shown at 124, the summary report generation module 178 is configured to generate one or more summary reports 130 of engine health of the tested engine 10 based on the analyzed output from the reasoner module 176. For example, referring particularly to FIG. 5, an exemplary summary report 130 generated in accordance with aspects of the disclosed system is illustrated. As shown, the summary report 130 may include a table (e.g. Table 1) comparing results from both analysis methods, i.e. TCDR analysis and core analysis. In addition, as shown in FIG. 5, the summary report 130 may include an analysis summary 134 and at least one recommendation 136 to the user regarding engine performance as determined by the reasoner module 176. For example, in the illustrated embodiment, a comparison of the EGT Margin Impact using both analysis methods is illustrated via the stack chart 132. Further, the analysis summary 134 sets forth that the TCDR analysis indicates that the primary contributors to the EGT margin are the high pressure turbine (HPT) and the high pressure compressor (HPC). As such, the recommendations 136 include guidance as to how personnel should address the performance issues.

Although a summary report 130 can provide a variety of information desired by a user of the subject application, examples of potentially applicable summary report information for a particular engine may include the engine type, the test date, the customer, the test rating, the power rating, an analysis summary 134, and/or recommendations 136. The summary report 130 may also include charts comparing the engine's performance to historical engines' performance, thus providing trend data on performance parameters such as thrust, SFC or other parameters of interest. Alerts can be included in the summary report 130 to identify anomalies with any performance parameters, instrumentation data, test enabling hardware or missing data. Thus, the summary report 130 provides a user with a high level summary related to engine performance.

Further, some summary reports may include selected parameters associated with one or more particular component(s) in an engine that are selectively compared with corresponding components in other similar engines and/or with an entitlement curve defining ideal performance levels for the one or more particular components. As such, the summary reports 130 can relate to engine in the test cell in near real time and can help in identifying opportunities to improve the engine.

Referring back to FIG. 2, the system 100 may also include at least one output device (e.g. remote computer 190) for providing the summary report 130 as electronic output to a user. Further, as shown at 126 of FIG. 4, the system 100 may be configured to upload and/or store the summary report 130 to an archival database and send the summary report 130 via electronic email to the user such that the user can receive the report 130 via the local or remote computer 180, 190. More specifically, as shown in FIG. 2, a user accessing the engine test cell analysis application 168 from a local computer 180 or a remote computer 190 linked via network 170 may be able to access the summary report associated with each of the individual tests performed by the test cell 102. Such reports may be displayed or printed, for example, using one or more output devices 188, 198 provided at respective computers 180, 190. Computers 180, 190 may also include input devices (e.g., 187 and 197) to select specific types of desired modeling or analysis results for viewing, such that customized visualizations based on selectable user configurations are possible for the summary reports. Input device 187 and output device 188 associated with local computer 180 may also be configured to provide input and output features for the controller 160 or other devices located at the engine 10.

As such, the summary reports 130 of the present disclosure provide the overhaul shop with prompt diagnostic support that is needed to identify root causes for performance issues. Thus, the present disclosure provides an automatic process that can be completed in a minimal time frame (e.g. less than hour) as opposed to conventional manual processes that can take days to complete.

The network 170 as described herein may correspond to any type of network, including but not limited to a dial-in network, a utility network, public switched telephone network (PSTN), a local area network (LAN), wide area network (WAN), metropolitan area network (MAN), personal area network (PAN), virtual private network (VPN), campus area network (CAN), storage area network (SAN), the Internet, intranet or ethernet type networks, combinations of two or more of these types of networks or others, implemented with any variety of network topologies in a combination of one or more wired and/or wireless communication links.

The processors 186, 196 as described herein may be adapted to operate as a special-purpose machine by executing the software instructions rendered in a computer-readable form stored in memory devices 184, 194. When software is used, any suitable programming, scripting, or other type of language or combinations of languages may be used to implement the teachings contained herein. In other embodiments, the systems and methods disclosed herein may alternatively be implemented by hard-wired logic or other circuitry, including, but not limited to application-specific circuits.

Memory modules contained within local server 164, local computers 180 and/or remote computers 190 may be provided as a single or multiple portions of one or more varieties of computer-readable media, such as but not limited to any combination of volatile memory (e.g., random access memory (RAM, such as DRAM, SRAM, etc.) and nonvolatile memory (e.g., ROM, flash, hard drives, magnetic tapes, CD-ROM, DVD-ROM, etc.) or any other memory devices including diskettes, drives, other magnetic-based storage media, optical storage media, solid state storage media and others. Exemplary input device(s) 187, 197 may include but are not limited to a keyboard, touchscreen monitor, eye tracker, microphone, mouse and the like. Exemplary output device(s) 188, 198 may include but are not limited to monitors, printers or other devices for visually depicting output data created in accordance with the disclosed technology.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A method of analyzing performance of engines in a test cell, the method comprising:
   electronically accessing engine operational data in a stored database of the test cell; and in response to at least one new test having been detected in the stored database for an engine, electronically retrieving the engine operational data corresponding to the at least one new test;
   inputting the engine operational data corresponding to the at least one new test into a performance model specific to an engine type for the engine;
   performing one or more integrity tests to the engine operational data corresponding to the at least one new test to ensure the engine operational data are reliable;
   electronically analyzing an output of the performance model, the analyzing including:
   conducting a diagnosis of the engine based on the engine operational data and historical data from a baseline engine having been tested in the test cell at a corresponding testing rating and a corresponding power rating; and
   providing at least one summary report as an output, wherein the at least one summary report includes the diagnosis.

2. The method of claim 1, further comprising incrementally checking the stored database for new tests in the test cell.

3. The method of claim 1, further comprising continuously storing the engine operational data from testing one or more engines in the test cell in real-time in the stored database.

4. The method of claim 1, wherein the performance model further comprises an experience-based model.

5. The method of claim 4, wherein the experience-based model comprises a Numerical Propulsion System Simulation (NPSS) model.

6. The method of claim 1, further comprising comparing the output from the performance model with historical data.

7. The method of claim 6, wherein the historical data comprises data from previously tested baseline engines of the same type.

8. The method of claim 1, wherein electronically analyzing the engine operational data corresponding to the new test further comprises:
   applying statistical analysis to the operational data corresponding to the at least one new test in order to detect for at least one of shifts, trends, or outliers whose data patterns fall outside of at least one pre-configured standard, and
   providing selected results of the statistical analysis as part of the at least one summary report.

9. The method of claim 1, further comprising electronically generating one or more alerts when non-optimal or anomalous behavior is detected within the operational data corresponding to the at least one new test.

10. The method of claim 1, further comprising generating at least one recommendation for the at least one summary report regarding engine performance.

11. The method of claim 10, wherein the at least one summary report is sent to the user in less than one hour.

12. The method of claim 1, further comprising uploading and storing the at least one summary report to an archival database and sending the at least one summary report via electronic email to a user.

13. The method of claim 1, wherein the engine operational data comprise data associated with at least one of one or more of starts, shutdowns, trips, load rejections, fuel transfers, combustion mode transfers, islanded load steps, periods suitable for steady-state performance evaluation, loading, unloading, and transients affecting engine component life.

14. The method of claim 1, wherein the analyzing further includes comparing a result of the analyzing with the diagnostic baseline.

15. An engine test cell analysis system, the system comprising:

a controller comprising at least one processor and at least one memory device, the memory device comprising computer-readable instructions for execution by the processor, wherein the processor is configured to perform one or more operations, the one or more operations comprising:

in response to at least one test having been detected:

electronically accessing the engine operational data in a stored database of the test cell, retrieving engine operational data corresponding to the at least one new test, inputting the engine operational data corresponding to the at least one new test into a performance model specific to an engine type for the engine;

performing one or more integrity tests to the engine operational data corresponding to the at least one new test to ensure the engine operational data are reliable;

electronically analyzing an output of the performance model, the analyzing including:

conducting a diagnosis of the engine based on the engine operational data and historical data from a baseline engine having been tested in the test cell at a corresponding testing rating and a corresponding power rating; and providing at least one summary report as an output, wherein the at least one summary report includes the diagnosis.

16. The system of claim 15, wherein the one or more operations further comprise comparing the output from the performance model with historical data.

17. The system of claim 15, wherein electronically analyzing the operational data corresponding to the at least one new test further comprises:

applying statistical analysis to the engine operational data corresponding to the at least one new test in order to detect for at least one of shifts, trends, or outliers whose data patterns fall outside of at least one pre-configured standard, and providing selected results of the statistical analysis as part of the at least one summary report.

18. The system of claim 15, wherein the one or more operations further comprise electronically generating one or more alerts when non-optimal or anomalous behavior is detected within the engine operational data corresponding to the at least one new test.

19. The system of claim 15, further comprising a reasoner configured to generate at least one recommendation for the at least one summary report regarding engine performance.

20. The system of claim 15, wherein the analyzing further includes comparing a result of the analyzing with the diagnostic baseline.

* * * * *